March 21, 1961 R. J. LIPSITZ 2,976,511
PHOTOGRAPHIC FLASH GUNS
Filed Sept. 22, 1958 3 Sheets-Sheet 1

INVENTOR.
ROBERT J. LIPSITZ
BY
Alfred W. Petchaft
ATT'Y.

March 21, 1961

R. J. LIPSITZ 2,976,511

PHOTOGRAPHIC FLASH GUNS

Filed Sept. 22, 1958

INVENTOR.
ROBERT J. LIPSITZ
BY Alfred W Petchaft
ATT'Y.

March 21, 1961

R. J. LIPSITZ 2,976,511

PHOTOGRAPHIC FLASH GUNS

Filed Sept. 22, 1958

INVENTOR.
ROBERT J. LIPSITZ
BY
Alfred Petchaft
ATT'Y

United States Patent Office 2,976,511
Patented Mar. 21, 1961

2,976,511

PHOTOGRAPHIC FLASH GUNS

Robert J. Lipsitz, Ladue, Mo., assignor to Kalimar, Inc., St. Louis, Mo., a corporation of Missouri Filed Sept. 22, 1958, Ser. No. 762,631

5 Claims. (Cl. 339—33)

This invention relates in general to certain new and useful improvements in photographic flash guns and, more particularly, to photographic flash guns of the so-called "B-C" circuit type.

In recent years, it has become a widespread practice among photographers to take various types of photographs, such as interior scenes, nighttime photographs, and the like, with a form of flashlight commonly referred to as a "flash gun." Many years ago, of course, photographers used an open tray of magnesium powder or similar pyrotechnical material which was ignited at the desired moment and burned very rapidly with the production of an intense white light that illuminated the scene being photographed. Some twenty-five or thirty years ago, the so-called "flash bulb" was developed in which magnesium floss or other pyrotechnical metallic material was incorporated within a transparent glass envelope or bulb and associated with a filament which had the property of becoming incandescent when a relatively small electrical current was applied to it. Such flash guns usually consisted of a tubular handle-like housing or shell provided at one end with a circular reflector and socket for receiving the flash bulb. Suitably disposed within the handle-like housing was a plurality of conventional flashlight batteries arranged in series. The difficulty with this type of flash gun was that the amount of electricity withdrawn to fire the flash bulb proved to be excessive and the batteries very quickly wore out. Moreover, such flash guns were comparatively large and somewhat cumbersome.

Subsequently, a flash gun circuit was developed in utilizing relatively small compact batteries and a capacitor arranged in series circuit with a resistor so that the capacitor could be charged up over a finite period of time by a very small amount of electrical current from the battery. The charge on the capacitor is then switched across the capacitor by a shutter operated switch or any other suitable means and the relatively high voltage charge on the capacitor is more than adequate to fire the flash bulb reliably and rapidly. Such capacitor-powered circuits have been referred to as B-C circuits and have made it possible to develop photographic flash guns which are extremely compact and in which the battery or power source is quite long-lasting.

However, both professional and amateur photographers have encountered one further problem in connection with the use of flash gun equipment. In taking flash pictures, varying ambient conditions are encountered which require different types of flash bulbs and, as a result, a number of different flash bulbs are available which have different degrees of intensity, different ignition speeds, and in which the emitted light may even have different color characteristics. Moreover, such flash bulbs are available in different types of socket-sizes. In fact, many professional and amateur photographers use different flash guns in different socket-sizes so as to be able to employ whichever flash bulb may fit the particular photographic situation encountered. Obviously, the use of several different flash guns and the supply of bulbs to fit each adds materially to the quantity of equipment which the photographer must carry about and is, therefore, not only expensive but inconvenient.

It is, therefore, one of the primary objects of the present invention to provide a photographic flash gun of the B-C type which is extremely compact in construction and design and is provided with a socket capable of receiving flash bulbs of different types and sizes.

It is another object of the present invention to provide a photographic flash gun of the type stated which is both economical and rugged in construction so as to be relatively free of breakage and malfunctioning.

It is a further object of the present invention to provide a photographic flash gun which can be quickly and conveniently folded into very compact form so that it may be conveniently carried about from place to place.

With the above and other objects in view, my invention resides in the novel features of form, construction, arrangement, and combination of parts presently described and pointed out in the claims.

Figure 1:
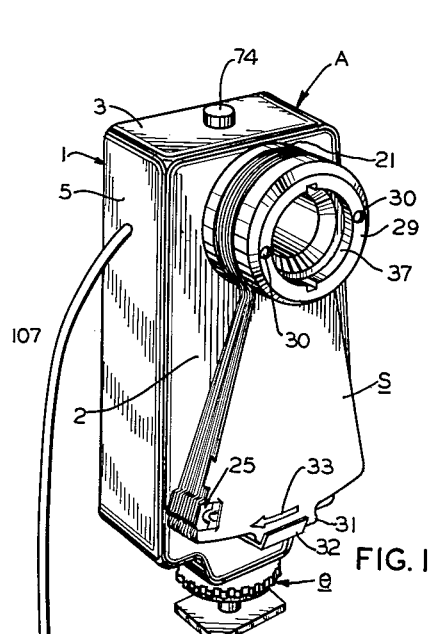
Fig. 1 is a perspective view of a photographic flash gun constructed in accordance with the present invention with the reflector in folded or transport position.

Referring now in more detail and by reference characters to the drawings, which illustrate a preferred embodiment of the present invention, A designates a photographic flash gun comprising a main shell or housing 1 preferably molded as an integral one-piece unit from a synthetic resin, such as Bakelite or polystyrene, and including a front wall 2, a top wall 3, a bottom wall 4, and two laterally presented side walls 5, 6, arranged in substantially rectangular conformation and marginally connected by somewhat rounded corners, as shown in Fig. 1. Also formed integrally with the housing 1 is a partition wall 7 extending transversely between the side walls 5, 6, in substantially parallelism with the top wall 3 and bottom wall 4, thereby subdividing the shell or housing 1 into an upper compartment $a$ and a lower compartment b. Interiorly within the corner between the top wall 3 and the side wall 5 is an internally threaded boss 8 and similarly formed upon the interior face of the side wall 6 approximately midway between the top wall 3 and the partition wall 7 is a boss 9, the bosses 8, 9, being drilled and tapped for purposes presently more fully appearing.

Provided for close fitting disposition closurewise across the open rearface of the compartment a is a cover plate 10 formed preferably of the same material as the housing 1 and marginally conforming to the shape thereof. This cover plate 10 is suitably apertured for receiving screws 11, 12, which respectively engage the bosses 8, 9, and serve to hold the plate 10 securely in closure-forming position across the compartment a. The cover plate 10 is also provided with two suitably spaced rectangular slots 13, 14, for receiving the prongs of an auxiliary connector of the conventional two-pronged or two-bladed type. Since this latter connector is entirely conventional and forms no part of the present invention, it is not shown or described in detail herein. Finally, the cover plate 10 is provided with two apertures 15, 16, for purposes presently more fully appearing. The lower transverse margin of the cover plate 10 is internally chamfered, as at 17, to provide a groove for receiving the upper transverse tongue portion 18 of an auxiliary cover plate 19 which conforms in marginal contour to the lower portion of the shell or housing 1 and extends closurewise across the lower compartment b, being releasably held in place by a spring clip 20 mounted in, and extending rearwardly from, the bottom wall 4.

Figure 4:
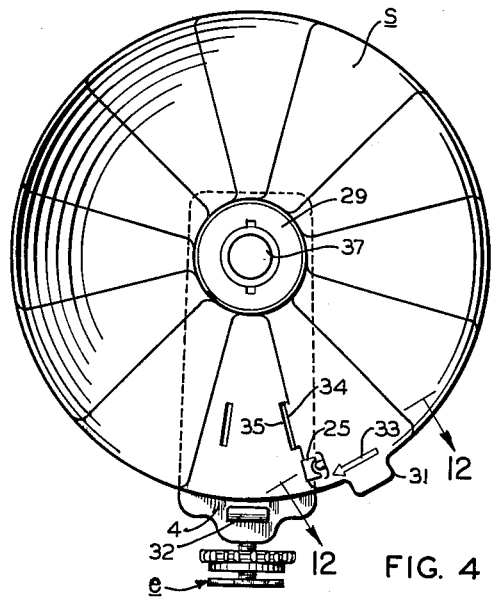
Fig. 4 is a front elevational view of the photographic flash gun of the present invention with the reflector in opened up or operative position.
Figure 2:
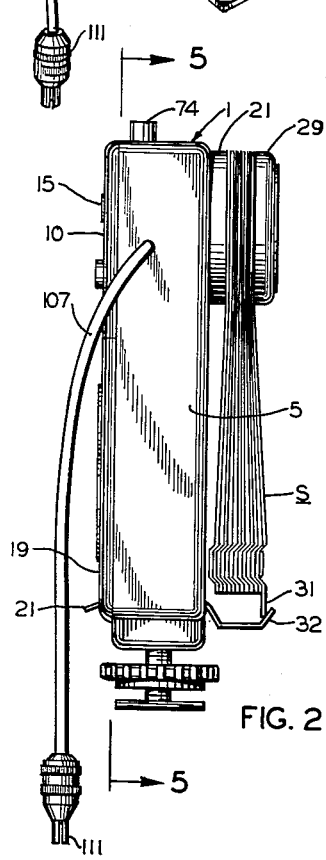
Fig. 2 is a side elevational view of the photographic flash gun shown in Fig. 1.
Figures 3, 5:
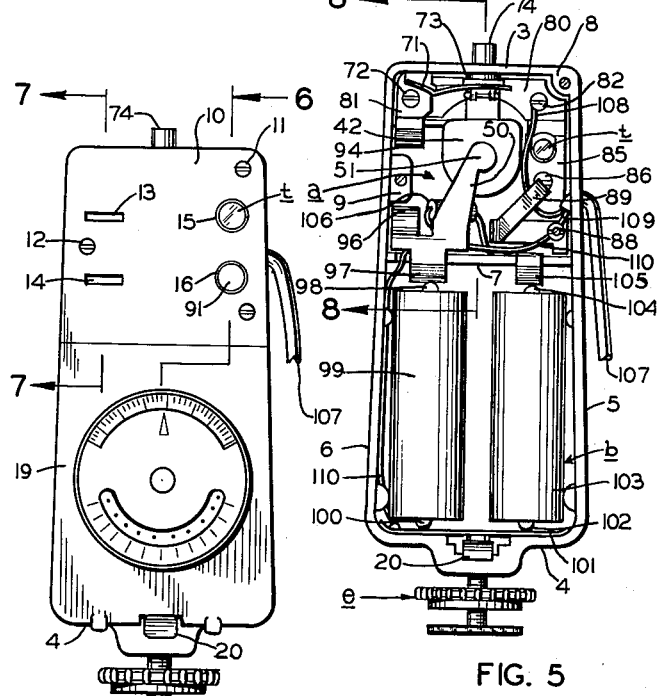
Fig. 3 is a rear elevational view of the photographic flash gun shown in Fig. 1.
Fig. 5 is a vertical sectional view taken along line 5—5 of Fig. 2.
Figure 8:
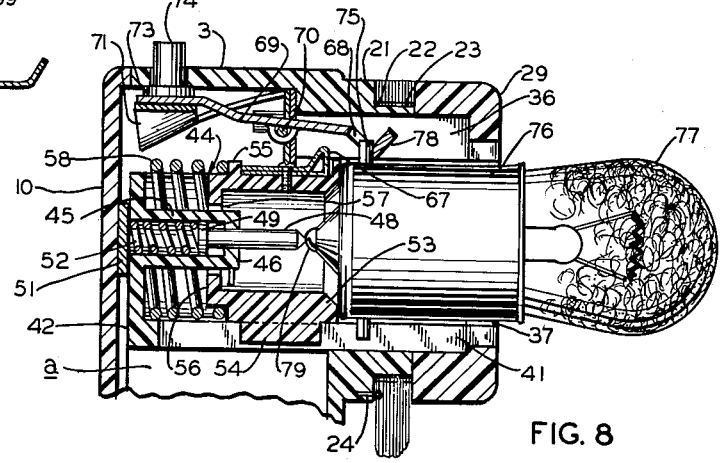
Fig. 8 is a fragmentary sectional view taken along line 8—8 of Fig. 5 showing a flash bulb of the large-base type in operative position within the flash gun.
Figure 9:
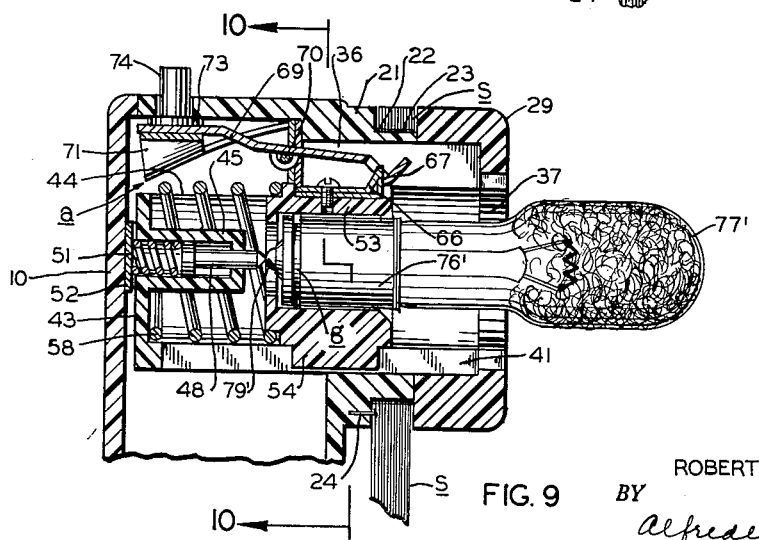
Fig. 9 is a fragmentary sectional view substantially similar to the view shown in Fig. 8 except that a flash bulb of the small-base type is shown in operative position.
Figure 14:
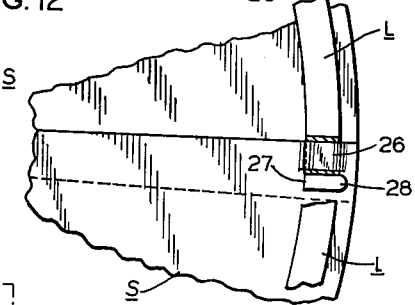
Fig. 14 is a fragmentary sectional view taken along line 14—14 of Fig. 13.
Figure 15:
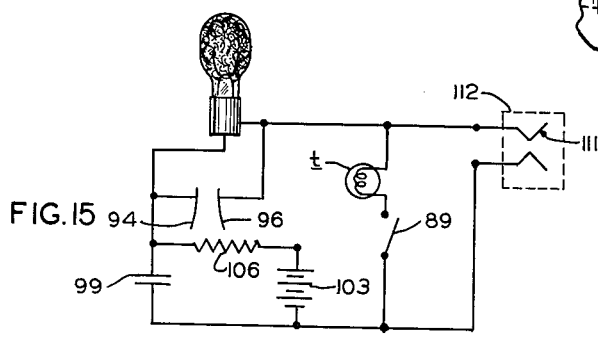
Fig. 15 is a schematic wiring diagram of the electrical circuit used in conjunction with the flash gun of the present invention.

Formed integrally upon, and projecting forwardly from, the upper end of the front wall 2 is a cylindrical boss 21 which is diametrally reduced at its forward end in the provision of a hub 22 for rotatably supporting a plurality of marginally registering reflector segments s, each having an annular end eye 23 encirclingly disposed upon the hub 22, as best seen in Figs. 8 and 9. The rearmost reflector segment s is held non-rotatably upon the hub 22 by means of a small pin 24 and the other reflector segments are slidably connected by slide links l, each of which is permanently secured by means of a loop 25 to a bight 26 struck out of the forward edge of each reflector segment s, substantially as shown in Figs. 14 and 15. The other end of each link l is slidably disposed within the next succeeding loop, as at 27, and at such end is provided with a lateral projection 28 serving as a stop to prevent complete withdrawal upon sliding movement. The stacked group of reflector segments s are retained upon the hub 22 by means of an annular retaining collar 29 which is held in place by a pair of retention screws 30. When the flash gun is in closed or transport position, the reflector segments are nested one within the other in marginal registration, as shown in Fig. 1, the forwardmost segment s being provided with a downwardly extending integral ear 31 which is resiliently held beneath a spring clip 32, as shown in Fig. 2. Just above the spring clip 32, the ear 31 is imprinted with an arrow 33 pointing in a clockwise position (reference being made to Fig. 1). Thus, when the flash gun A is readied for operation, the forwardmost reflector segment s is pushed in the direction of the arrow until the ear 31 is disengaged from the spring clip 32. This clockwise pushing movement is continued and the segments will successively unfold until the reflector assumes a substantially circular conformation and all of the links are fully extended with each of the segments s slightly overlapping. When the segment s are fully extended, however, they do not completely cover the area of the full circle and the user, thereupon, can continue the circular pulling action applied to the forwardmost reflector segment s until it is brought down into overlapping relation with the rearmost reflector segment s, that is to say, the one which is held in non-rotative position upon the hub 22 by means of the pin 24. The latter reflector segment s is provided along its righthand margin (reference being made to Fig. 4) with a reversely bent hook element 34 which can be snapped into engagement with a similarly located hook element 35 on the lefthand edge of the forwardmost reflector segment s. In bringing the rearmost and forwardmost reflector segments s into engaged position as just described, all of the reflector segments will be slightly bowed to form a somewhat dished, forwardly presented light reflector which is disposed concentrically around the boss 21 and hub 22.

The boss 21 and its associated hub 22 are axially relieved to provide a socket-forming opening 36 which opens to the interior of the compartment a and similarly the collar 29 is relieved to provide a coaxial bulb-receiving aperture 37. On its interior face, the socket-forming opening 36 is provided with a plurality of axial slots 38, 39, 40, 41. As will be seen by reference to Fig. 10, the slot 38 is at the top of the socket-forming opening 36 and the slot 41 is diametrally opposite thereto at the bottom of the socket-forming opening 36. The slots 39, 40, are disposed at the bottom of the socket-forming opening 36 in symmetrically spaced relationship on opposite sides of the slot 41 and are provided with upwardly and rearwardly inclined slide faces 39', 40', respectively. Formed integrally upon the rear face of the front wall 2 in substantially concentric alignment with the opening 36 is a somewhat tubular socket-extension 42 which is integrally provided at its rear end with a flat end wall 43 located in relatively close juxtaposition with the interior face of the cover plate 10. Along its upper surface, the socket-extension 42 is cut away in the provision of an access opening 44 and at the bottom, the socket-extension 42 is provided with slotted continuations of the slots 39, 40, 41. Formed integrally with, and extending forwardly from, the rear wall 43 of the socket-extension 42 is a coaxial tubular slide cylinder 45 which opens upon the rear face of the wall 43 and at its forward end is provided with a vertical wall 46 having a central aperture 47 for slidably accommodating a contact pin 48 fabricated from an electrically conductive metal and integrally formed, at its rearward end, with a cylindrical head 49 which slidably engages the cylindrical interior wall of the slide cylinder 45. Rigidly mounted upon the transverse partition wall 7 and extending vertically upwardly therefrom is a contact blade 50 fabricated from a somewhat resilient electrically conductive metal and having a flattened head portion 51 which is located in rearwardly spaced coaxial alignment with the slide cylinder 45, being abuttingly supported on its rear face against the rear face of the cover plate 10. Disposed within the slide cylinder 49 and interposed between the forwardly presented face of the head portion 51 and the rearwardly presented face of the head 49 is a compression spring 52 which normally urges the contact pin 48 forwardly within the slide cylinder 45.

Shiftably mounted within the socket-forming opening 36 is a cylindrical secondary socket 53 formed of suitable dielectric material and being provided with a depending tongue or key 54 which is shiftably disposed within the slot 41. Thus, the secondary socket 53 will shift axially to-and-fro, but will not rotate, within the socket-forming opening 36. At its rearward end, the secondary socket 53 is provided with an annular shoulder 55 and a vertical back wall 56, the latter being provided with a central clearance aperture 57 which is slightly larger in diametral size than the outside diametral size of the slide cylinder 45 so as to slip freely thereover.

Disposed within the socket-extension 42 and interposed between the forwardly presented face of the rear wall 43 and the annular shoulder 55 is a compression spring 58 which normally urges the secondary socket 53 forwardly within the socket-forming opening 36. The secondary socket 53 is further provided with two radial slots 59, 60, which are respectively aligned with the slots 39, 40. Slidably mounted within the slots 59, 60, are metallic contact blades 61, 62, respectively, which project downwardly into the slots 39, 40, and at their lower ends are provided with forwardly extending arcuately curved slider feet 63, 64, respectively, the latter being adapted to slide along the inclined faces 39', 40', of the slots 39, 40. When the flash gun is not in use, the spring 58 will normally urge the secondary socket 53 forwardly within the socket-forming opening 36 until the forward margins of the slider feet 63, 64, come into stop-forming abutment against the vertical interior faces f of the slots 39, 40. It will be noted that, in this latter position, the slider feet 63, 64, will move radially outwardly along the inclined faces 39', 40', so that the contact blades 61, 62 will drop radially down within the slots 59, 60, for purposes presently more fully appearing.

Figure 10:
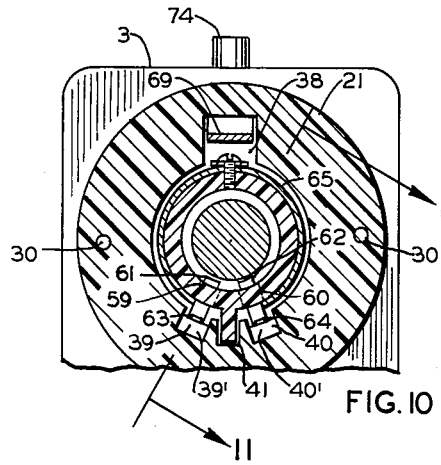
Fig. 10 is a fragmentary sectional view taken along line 10—10 of Fig. 9.

Rigidly mounted upon, and extending cylindrically around the outer face of the secondary socket 53, is a metallic sleeve 65 which is in edgewise sliding electrical contact with the contact blades 61, 62 as shown in Fig. 10. Similarly mounted upon the upper side of the secondary socket 53 and upon the metallic sleeve 65 is a metallic element 66 having an upstanding prong 67 for optional engagement within a detent notch 68 formed in the forward end of a rock-arm 69 which is pivoted approximately at its mid-point upon a fulcrum-pin 70. At its rear end the rock-arm 69 is biased upwardly by a leaf-spring 71 which is rigidly mounted within the compartment a by means of a screw 72. On its upper face the rear end of the rock-arm 69 abuts against the downwardly presented headed end 73 of a dielectric push button 74 which is shiftably mounted in the top wall 3. The detent notch 68 is so located that it will retentively engage and form contact with one of the radially projecting side wall pins 75 on the base 76 of a large-sized flash bulb 77. When the latter is inserted into the socket-forming opening 36, the flat end face of the base 76 is abuttingly engaged against the end face of the secondary socket 53 as shown in Figure 8 and the force of the spring 58 holds the pin 75 within the detent notch 68. In this connection, it should be noted that the rock-arm 69 is turned up at its forward end to provide an angular flange 78 which will initially engage the pin 75 as the flash bulb 77 is pushed into place and will, in effect, cam the rock-arm 69 upwardly against the pin 75 to enter the detent notch 68. It should also be noted that the pin 48 is long enough to project axially through the secondary socket 53 and make electrical contact with the central contact-button 79 of the flash bulb 77.

Figure 7:
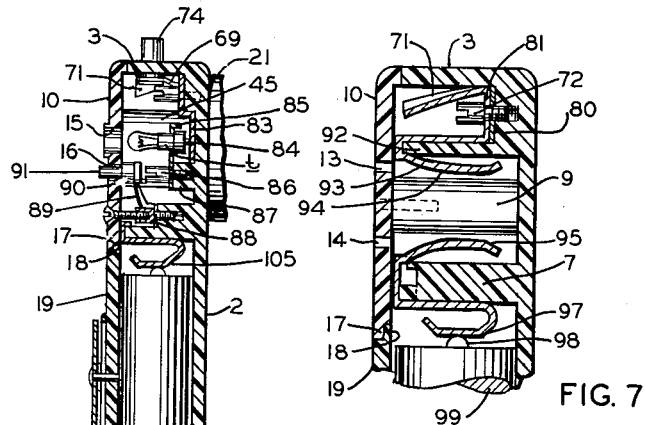
Fig. 7 is a fragmentary sectional view taken along line 7—7 of Fig. 3.
Figure 6:
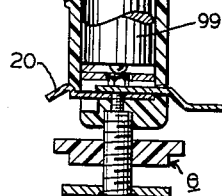
Fig. 6 is a vertical sectional view taken along line 6—6 of Fig. 3.

Mounted in the upper portion of compartment a and extending transversely thereacross against the interior face of the front wall 2 is a connection blade 80 formed of electrically conductive metal and being held in tight electrical contact beneath the flange 81 of the leaf-spring 71 by means of the screw 72 as shown in Fig. 7. At its opposite end the connection blade 80 is secured by a screw 82 and is bent flatwise down into a molded recess 83 formed on the interior face of the front wall 2 as shown in Fig. 6 for contactive engagement with the center-contact 84 of a very tiny high-resistance test lamp t, the base of which is conductively held in a small leaf-spring member 85 which is, in turn, rigidly mounted, by means of a large-headed screw 86 on a molded boss 87 formed upon the interior face of the front wall 2, the test lamp t being positioned in alignment with the aperture 15 of the closure plate 10 so as to be visible therethrough. Also mounted within compartment a upon the interior face of the front wall 2 by means of a screw 88 is a resilient contactor blade 89 which is biased outwardly toward the closure plate 10 and bears against the headed end 90 of a dielectric push button 91 which is shiftably mounted in the aperture 16. As may be seen by reference to Fig. 6, when the push button 91 is pressed inwardly the upper end of the blade 89 will make contact with the head of the screw 86 to close a circuit through the test lamp t.

Formed integrally on the lower end of the leaf-spring 71 and extending around a shelf 92 molded as an integral part of the housing 1, is an auxiliary contactor 93, having an inwardly turned spring blade 94 disposed in closely spaced relation to the upper face of the boss 9. Similarly formed as an integral extension of the contact blade 50 is a second auxiliary contactor 95 having an inwardly turned spring blade 96 disposed in close proximity to the underside of the boss 9. The spring blades 94, 96 are, furthermore, located directly behind the slots 13, 14, respectively, for contactively engaging the prongs of the conventional two-pronged auxiliary connector previously referred to.

Also formed integrally on the leaf-spring 71 and extending around the transverse portion wall 7 is a spring-blade contactor 97 which contactively engages the upper terminal 98 of a condenser 99 disposed within compartment b. The condenser 99 also has a lower terminal 100 which contactively engages a contactor element 101 securely mounted on the interior face of the bottom wall 4. This contactor element 101 also contactively engages the lower terminal 102 of a battery 103 which is also disposed within compartment b. The battery 103, in turn, extends upwardly to the top of compartment b in side-by-side relation to the condenser 99 and, at its upper end, the battery 103 is provided with a terminal 104 which contactively engages a spring-blade contactor 105 mounted upon the partition wall 7 and electrically connected through a resistor 106 to the contact blade 50. Finally, a two-wire conductor 107 is inserted through the side wall 5, one lead 108 being connected to the screw 82 and the other lead 109 being connected to the screw 88 and also, by a lead-continuation 110, to the contactor element 101. The electrical connections, thus physically described, constitute the electrical circuit schematically shown in Fig. 15. At its remote end the conductor is provided with a camera-connection plug 111.

In use, the flash gun A normally can be carried from place to place by the user in the folded up or transport position shown in Fig. 1. When the user desires to set up the flash gun A for picture-taking purposes the adjustment element e is mounted upon the camera-holding bracket or other device with which it is commonly associated. Inasmuch as the adjustment element e is entirely conventional and does not, in and of itself, constitute any part of the present invention, it has not been specifically described herein, and the holding receptacle of the camera or flash gun supporting bracket with which it is associated has not been shown or described. It is sufficient for present purposes merely to note that the flash gun A is suitably mounted in any conventional manner common in the photographic eye. The reflector segments s are opened up in the manner previously described and the camera-connection plug 111 is inserted into the appropriate receptacle of the camera (not shown) so that the circuit can be completed upon closure of the shutter switch 112. The shutter switch 112 is also a conventional element commonly built into present-day cameras and does not, in and of itself, constitute a part of the present invention, except in the general sense that upon actuation in the usual manner it will complete a circuit to the flash bulb as will be presently more fully described. The shutter switch 112, therefore, is merely shown schematically in the wiring diagram, Fig. 15, but it is not mechanically described herein.

If the user desires to use a large-sized flash bulb, such as the flash bulb 77 shown in Fig. 8, the base 76 of the bulb 77 is inserted through aperture 37 into the socket opening 36. The end face of the base 76 is thus brought into coaxial alignment with the secondary socket 53 and as the base 76 of the bulb 77 is pushed inwardly the base abuts against the forwardly presented end face of the auxiliary socket 73. Further inward movement of the base 76 will compress the spring 58 and finally one of the prongs 75 of the bulb base 76 will become engaged with the detent notch 68 as previously described and the end terminal 79 of the bulb 77 will engage the contact pin 48 pushing it somewhat against the base of the spring 52 and making electrical contact through the head end 51 of the contact plate 50. Before tripping the shutter and thereby making an exposure, the user may test the circuit by manually depressing the push button 91 and closing the circuit through the test lamp *t*. If the condenser or capacitor 99 is fully charged and if the circuit through the flash bulb 77 is continuous, the test lamp *t* will light up. Since the only resistance of the test lamp *t* is relatively high, it will not draw enough current to ignite the filament of the flash bulb 77 and cause the latter to fire. Once it has been determined that the capacitor 99 is fully charged and that the circuit is continuous, the user may actuate the shutter thereby closing the shutter switch 112 and discharging the condenser 99 directly through the flash bulb 77, thereby causing the flash bulb 77 to fire and produce the desired illumination necessary for photographic purposes.

Once the flash bulb 77 has been fired, the push button 74 may be depressed, thereby swinging the rock-arm 69 so as to lift the forward end thereof out of engagement with the pin 75 and releasing the flash bulb 77 which will then be forcibly expelled from the flash gun A by the action of the springs 52, 58.

Figure 11:
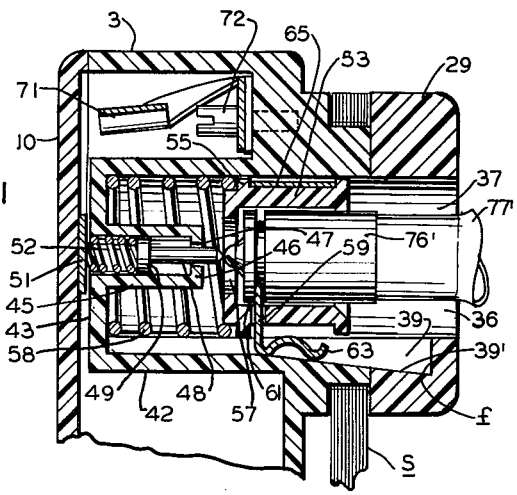
Fig. 11 is a fragmentary sectional view taken along line 11—11 of Fig. 10.
Figure 13:
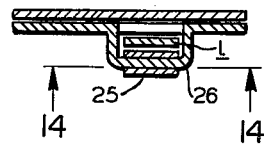
Fig. 13 is a fragmentary sectional view taken along line 13—13 of Fig. 12.
Figure 12:
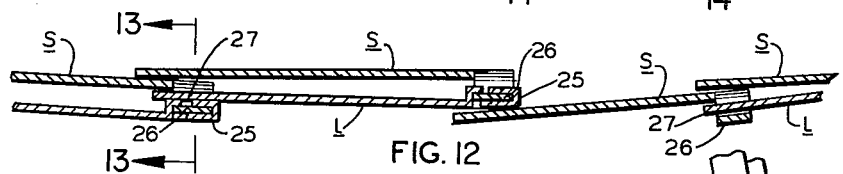
Fig. 12 is a fragmentary sectional view of the reflector forming a part of the present invention, taken along line 12—12 of Fig. 4.

If the user desires to employ a small-sized flash bulb, such as flash bulb 77' shown in Fig. 9, such flash bulb may be inserted through the aperture 37 and into the interior of the secondary socket 53, which is thereupon pushed inwardly against the bias of the spring 58 until the prong 67 is engaged within the detent notch 68, thereby holding the secondary socket 53 in inwardly disposed position as shown in Fig. 9. The inward shifting movement of the secondary socket 53 will cause the slider feet 63, 64, of the contact blades 61, 62, to ride inwardly and upwardly along the inclined faces 39', 40' of the slots 39, 40, and as a result, the inward ends of the contact blade 61 will engage within a small annular groove *g* which is formed around the base 76' of the flash bulb 77', thereby holding the flash bulb 77' mechanically within the secondary socket 53 and also making electrical contact with the bulb base 76'. In this latter position, the central contact 79' of the bulb 77' will be contactively engaged with the pin 48, all as best seen in Fig. 11. The electrical circuit will, of course, be identical with that previously described in connection with the large-sized flash bulb 77.

It will, of course, be immediately apparent from the drawings that the flash gun A, as shown and described, will accommodate either the so-called midget flash bulbs and intermediate flash bulbs which are available in practically all commonly used speeds and intensities and constitute the most commonly used types of flash bulbs at the present time. However, it should be also noted that the flash gun A can be designed to accommodate two different types of flash bulbs other than the midget and intermediate bulbs now commonly in use.

It should be understood that changes and modifications in the form, construction, arrangement, and combination of the several parts of the photographic flash guns may be made and substituted for those herein shown and described without departing from the nature and principle of my invention.

Having thus described my invention, what I claim and desire to secure by letters patent is:

1. A flash gun comprising a housing having an open-ended recess adapted to receive the base of a photoflash bulb, an arm swingably mounted in the recess, detent means on the arm for engaging the base of the bulb and holding it in operative position within the recess, auxiliary socket-forming means slidably mounted within the recess and being adapted for receiving the base of a photoflash bulb which is smaller than the first-mentioned base, spring means for normally urging the auxiliary socket-forming means forwardly toward the open end of the recess, said recess having an axial slot with an upwardly and inwardly inclined bottom wall formed therein, contact means mounted in the auxiliary socket-forming means for engagement with the smaller bulb-base, catch-means on the auxiliary socket-means for optionally holding said auxiliary socket-means in an inwardly pushed position, and means associated with said contact means and operatively riding against said inclined bottom wall whereby to shift said contact means into engagement with the smaller bulb-base as the latter is pushed into the auxiliary socket-forming means and thereby shifts said auxiliary socket-means rearwardly into engagement with the catch-means.

2. A flash gun comprising a housing having an open-ended recess adapted to receive the base of a photoflash bulb, an arm swingably mounted in the recess, detent means on the arm for engaging the base of the bulb and holding it in operative position within the recess, auxiliary socket-forming means slidably mounted within the recess and being adapted for receiving the base of a photoflash bulb which is smaller than the first-mentioned base, spring means for normally urging the auxiliary socket-forming means forwardly toward the open end of the recess, said recess having an axial slot with an upwardly and inwardly inclined bottom wall formed therein, contact means mounted in the auxiliary socket-forming means for engagement with the smaller bulb-base, catch-means on the auxiliary socket-means for optionally holding said auxiliary socket-means in an inwardly pushed position, means associated with said contact means and operatively riding against said inclined bottom wall whereby to shift said contact means into engagement with the smaller bulb-base as the latter is pushed into the auxiliary socket-forming means and thereby shifts said auxiliary socket-means rearwardly into engagement with the catch-means, and means for electrically connecting the contact means and the arm to a source of electrical current.

3. A flash gun comprising a housing having an open-ended recess adapted to receive the base of a photoflash bulb, an arm swingably mounted in the recess, detent means on the arm for engaging the base of the bulb and holding it in operative position within the recess, auxiliary socket-forming means slidably mounted within the recess and being adapted for receiving the base of a photoflash bulb which is smaller than the first-mentioned base, spring means for normally urging the auxiliary socket-forming means forwardly toward the open end of the recess, said recess having an axial slot with an upwardly and inwardly inclined bottom wall formed therein, contact means mounted in the auxiliary socket-forming means for engagement with the smaller bulb-base, catch-means on the auxiliary socket-means for optionally holding said auxiliary socket-means in an inwardly pushed position, means associated with said contact means and operatively riding against said inclined bottom wall whereby to shift said contact means into engagement with the smaller bulb-base as the latter is pushed into the auxiliary socket-forming means and thereby shifts said auxiliary socket-means rearwardly into engagement with the catch-means, and means for electrically connecting the contact means and the arm to each other and a source of electrical current.

4. A flash gun comprising a housing having an open-ended recess adapted to receive the base of a photoflash bulb, an arm swingably mounted in the recess, detent means on the arm for engaging the base of the bulb and holding it in operative position within the recess, auxiliary socket-forming means slidably mounted within the recess and being adapted for receiving the base of a photoflash bulb which is smaller than the first-mentioned base, spring means for normally urging the auxiliary socket-forming means forwardly toward the open end of the recess, said recess having an axial slot with an upwardly and inwardly inclined bottom wall formed therein, contact means mounted in the auxiliary socket-forming means for engagement with the smaller bulb-base, catch-means on the auxiliary socket-means for optionally holding said auxiliary socket-means in an inwardly pushed position; means associated with said contact means and operatively riding against said inclined bottom wall whereby to shift said contact means into engagement with the smaller bulb-base as the latter is pushed into the auxiliary socket-forming means and thereby shifts said auxiliary socket-means rearwardly into engagement with the catch-means, means for electrically connecting the contact means and the arm in common to one terminal of an electrical power supply, and a center-contact element mounted within the housing for co-operation in common with the recess and the auxiliary socket-forming means, said center-contact element being electrically connected to the other terminal of an electrical power supply.

5. A flash gun comprising a housing having an open-ended recess adapted to receive the base of a photoflash bulb, an arm swingably mounted in the recess, detent means on the arm for engaging the base of the bulb and holding it in operative position within the recess, auxiliary socket-forming means slidably mounted within the recess and being adapted for receiving the base of a photoflash bulb which is smaller than the first-mentioned base, spring means for normally urging the auxiliary socket-forming means forwardly toward the open end of the recess, said recess having an axial slot with an upwardly and inwardly inclined bottom wall formed therein, contact means mounted in the auxiliary socket-forming means for engagement with the smaller bulb-base, catch-means on the auxiliary socket-means for optionally holding said auxiliary socket-means in an inwardly pushed position, means associated with said contact means and operatively riding against said inclined bottom wall whereby to shift said contact means into engagement with the smaller bulb-base as the latter is pushed into the auxiliary socket-forming means and thereby shifts said auxiliary socket-means rearwardly into engagement with the catch-means, and manually operable means for releasing the arm to release the photoflash bulb which has been inserted into the flash gun.

References Cited in the file of this patent

UNITED STATES PATENTS

| | | |
|---|---|---|
| 2,586,583 | Wagner | Feb. 19, 1952 |
| 2,624,831 | Farber | Jan. 6, 1953 |
| 2,629,762 | Fox | Feb. 24, 1953 |
| 2,804,537 | Greger | Aug. 27, 1957 |
| 2,806,134 | Tarcici | Sept. 10, 1957 |
| 2,848,701 | McKee et al. | Aug. 19, 1958 |

FOREIGN PATENTS

| | | |
|---|---|---|
| 931,147 | Germany | Aug. 1, 1955 |